(12) United States Patent
Ehrlich et al.

(10) Patent No.: US 7,426,877 B2
(45) Date of Patent: Sep. 23, 2008

(54) DEVICE FOR DETERMINING THE ACTUAL REVERSAL OF THE DIRECTION OF ROTATION OF A REVERSING ROTATIONAL DRIVE

(75) Inventors: Stefan Ehrlich, Vienna (AT); Christian Stöger, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/538,607

(22) Filed: Oct. 4, 2006

(65) Prior Publication Data
US 2007/0113682 A1    May 24, 2007

(30) Foreign Application Priority Data
Oct. 4, 2005    (DE) .................... 10 2005 047 366

(51) Int. Cl.
*G01N 3/08* (2006.01)
(52) U.S. Cl. ............................. 73/862.328; 73/862.333
(58) Field of Classification Search .................. 73/862.328–862.333
See application file for complete search history.

(56) References Cited

U.S. PATENT DOCUMENTS 4,263,590 A * 4/1981 Arnold et al. ............... 340/672
4,594,583 A * 6/1986 Seko et al. .................. 340/576
6,198,175 B1 * 3/2001 Kalb et al. .................. 307/10.1
7,216,030 B2 * 5/2007 Kassner ...................... 701/112

FOREIGN PATENT DOCUMENTS

| DE | 4210933 A1 | 10/1993 |
|---|---|---|
| EP | 1175598 B1 | 9/2004 |
| WO | 0177693 A1 | 10/2001 |

* cited by examiner

*Primary Examiner*—Max Noori
(74) *Attorney, Agent, or Firm*—Baker Botts L.L.P.

(57) ABSTRACT

A device for determining the actual reversal of the direction of rotation of a rotational drive continuing to operate after previous switching of the direction of rotation, in particular for window lifting systems or sliding roof drives in a motor vehicle, has a sensor wheel (1) with a coding structure (9) configured asymmetrically in respect of distribution along the periphery of the sensor wheel (1); a single detector (2), which generates a rotor speed-dependent pulse signal during rotation of the sensor wheel (1) by scanning the coding structure (9); and an evaluation unit (4), to which the pulse signal is fed and which determines the actual reversal of the direction of rotation by evaluating the pulse edges; wherein the coding structure (9) is formed by coding sectors (10) of a first sector width (11) and a reference coding sector pair (12) with a second sector width (13).

21 Claims, 5 Drawing Sheets

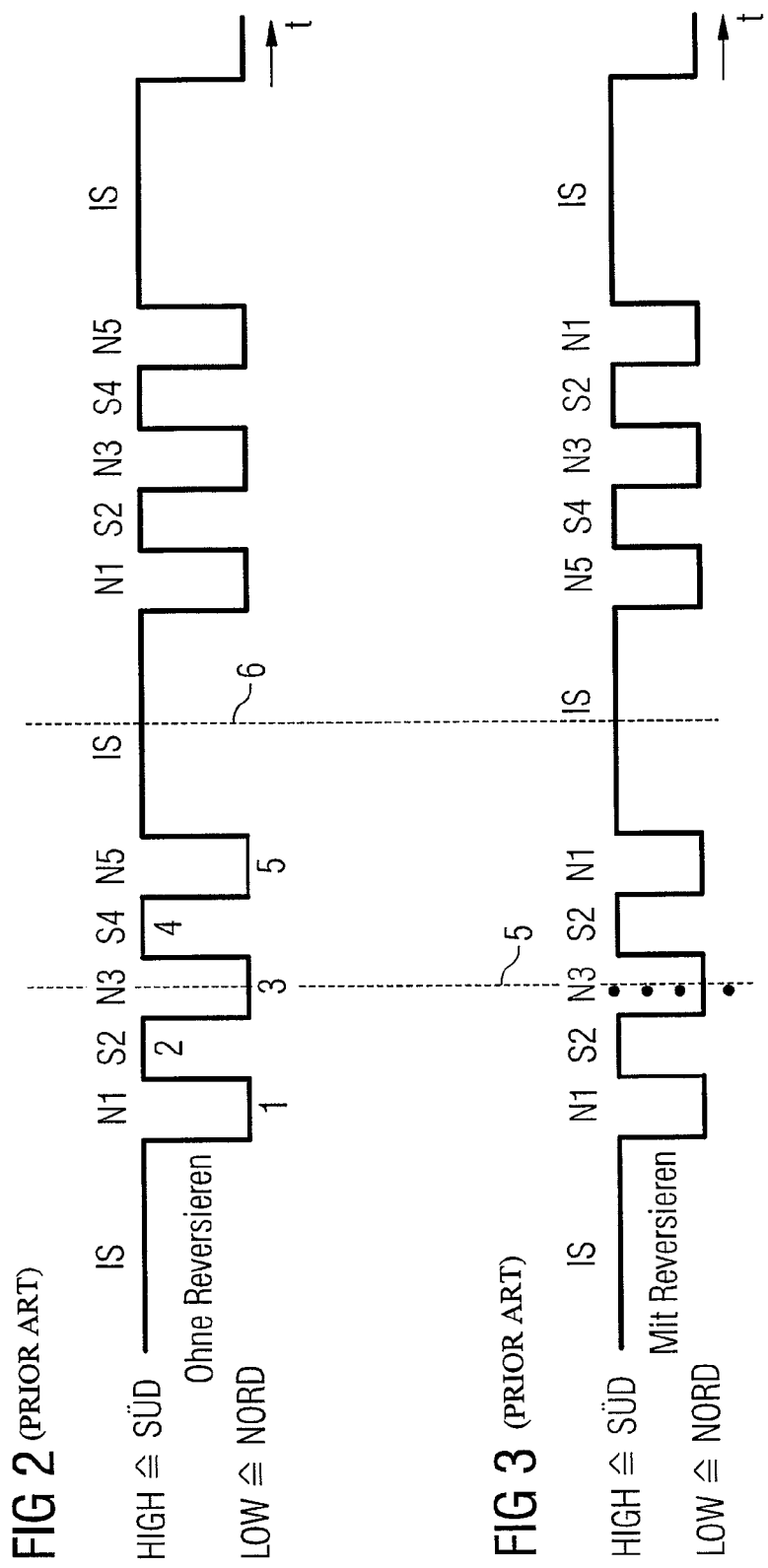

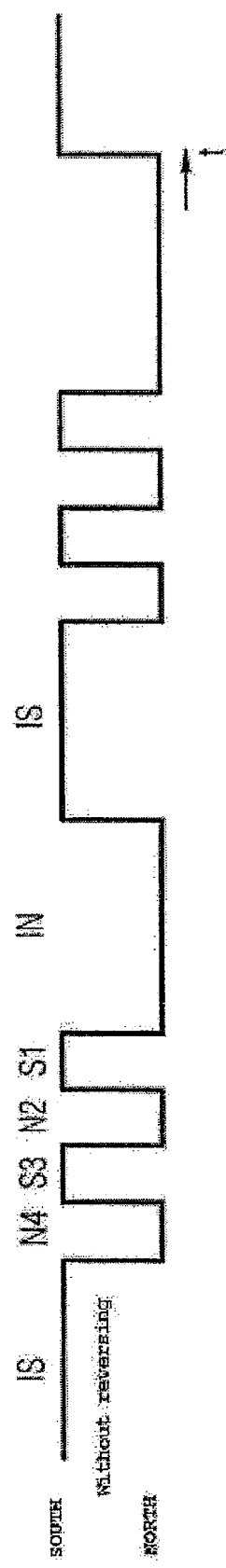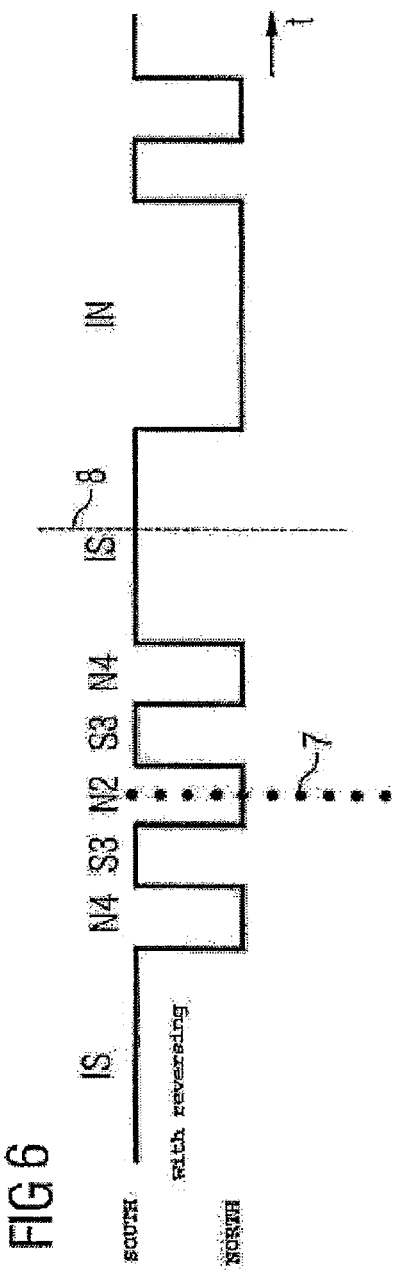
FIG 5
FIG 6

DEVICE FOR DETERMINING THE ACTUAL REVERSAL OF THE DIRECTION OF ROTATION OF A REVERSING ROTATIONAL DRIVE

PRIORITY

This application claims priority from German Patent Application No. DE 10 2005 047 366.0, which was filed on Oct. 4, 2005, and is incorporated herein by reference in its entirety.

TECHNICAL FIELD

The invention relates to a device for determining the actual reversal of the direction of rotation of a reversing rotational drive, which drives a motor-operated closing element, in particular a window or sliding roof cover of a motor vehicle.

BACKGROUND

In the case of electromechanical actuators, incremental sensor systems are generally used to determine the speed and direction of rotation, essentially comprising a rotor-side sensor wheel and a stator-resistant arrangement of detectors. The detectors scan the sensor wheel and generate an electrical signal as a function of the rotor position, comprising a series of pulses. This pulse signal is fed to an evaluation/control device for evaluation. The evaluation/control device generally comprises a microcomputer, which determines the path traveled by counting the incremental sensor pulses or calculates the instantaneous speed of rotation from the current length of the rectangular pulses. Where two detectors are used, the direction of rotation can simply be obtained from the phase displacement between these two rectangular signals.

However electromechanically operated actuators for window lifting systems and sliding roofs are known from motor vehicle technology, wherein only a single Hall sensor is used to detect the magnetic field of a rotor-side magnetic sensor wheel.

It is also known that in the case of electromechanical window lifting systems or sliding roof drives, anti-trap protection is required for safety reasons. New legal provisions require a high degree of safety. If trapping occurs, not only does the movement of the closing element have to be stopped but once a maximum permitted trapping force has been exceeded, the drive has to be reversed immediately and the closing element has to be moved back in the opening direction. Because of the mechanical inertia of the drive system however the actual reversal of the direction of rotation does not correspond to the electrical switching process, the reversal of the polarity of the armature voltage of the motor but follows this with a time delay. Effective anti-trap protection is then only ensured, if the control device can detect the actual reversal of the direction of rotation correctly.

In order also to be able to identify this actual reversal of the direction of rotation in the case of an arrangement with just one magnetic field detector, a magnetic wheel is proposed in EP 1175598 B1, having magnetic poles disposed asymmetrically along the periphery. It has nine poles of equal pole width and a reference pole with a pole width that is comparatively larger than this. With this arrangement the problem can arise that a measurement uncertainty results, if the drive is randomly reversed from a position, in which the reference pole is located spatially in a position diametrically opposite the Hall sensor. As the pattern of the pulse diagram has mirror symmetry at this reversal point, the determination of the actual reversal of direction of rotation can be subject to an error of plus/minus half a rotation of the drive shaft. In the case of a window lifting drive this can result in the safety effect of the anti-trip protection being impaired or the window not fully achieving the intended closing position.

SUMMARY

The object of the present invention is to improve anti-trap protection in the case of a rotational drive for a window lifting system or a sliding roof of a motor vehicle using only a single stator-side detector and to allow precise determination of the reversal of the direction of rotation.

According to the invention this object can be achieved by a coded sensor wheel, made up of coding sectors of a first sector width and a reference coding sector pair of a second sector width, which is different from the first sector width. This makes it possible for an evaluation/control unit to calculate the actual position correctly from the detector signal during a reversal of the direction of rotation—even in the case of an arrangement with only one single stator-side detector. The physical configuration of the sensor wheel can vary—as can the measuring principle underlying the acquisition of the angle information. The sensor wheel can be configured in a disk or drum-shaped manner for example. The coding sectors configured on the sensor wheel or the reference coding sector pair are able to be scanned in a magnetic, photoelectric, capacitive, inductive or other manner.

The sensor wheel can be configured as a drum-shaped magnetic wheel and may have poles of a first pole width and a reference pole pair of a second pole width, which is significantly different from the first pole width. The measurement uncertainty of +/− half a motor rotation discussed above in the case of such an incremental sensor system can be eliminated by the invention. The extent of the difference between the first and second pole widths can vary depending on the design and arrangement of the magnetic field detector.

In one embodiment the pole width of the magnetic pole pair can be greater than the pole width of the magnetic poles. This gives both the required indexing and the necessary incremental resolution at the same time. A sensor wheel configured as a magnetic drum with a magnetic pole pair and four or six magnetic poles has proven to be favorable for correct determination of the point of reversal of the direction of rotation in the case of a window lifting drive in a motor vehicle. It is however also possible to configure the magnetic pole pair with a smaller sector width than the individual poles.

In one embodiment, the pole widths of the individual poles of the magnetic pole pair are of equal size.

It may be advantageous, if the evaluation/control unit contains a microcontroller and the pulse signal is fed to an interrupt input, with each rising and falling pulse edge respectively triggering an interrupt.

For program purposes it can be favorable if during an interrupt a time value generated internally in the microcontroller is stored in a table and pulse signal lengths are determined and stored continuously by differentiation with corresponding time values stored previously in the table. This can have a favorable influence on the movement sequence of an actuating process.

It is hereby possible to determine the actual reversal of the direction of rotation very easily based on a change from a monotonous increase to a monotonous decrease in pulse signal lengths.

As the magnetization of a drum-shaped sensor wheel is subject to manufacture-related fluctuations, an initialization run maybe favorable. To this end pulse signal lengths, which were determined by means of an averaging method during first commissioning, are stored in the table.

BRIEF DESCRIPTION OF THE DRAWINGS

To describe the invention further, reference is made in the next part of the description to drawings, from which further advantageous refinements, details and developments of the invention will emerge.

FIG. 2 shows a pulse diagram for FIG. 1 in continuous operation;

FIG. 3 shows a pulse diagram for FIG. 1 with a switched direction of rotation;

FIG. 5 shows a pulse diagram for FIG. 4 in continuous operation;

FIG. 6 shows a pulse diagram for FIG. 4 with a switched direction of rotation;

DETAILED DESCRIPTION

Figure 1:
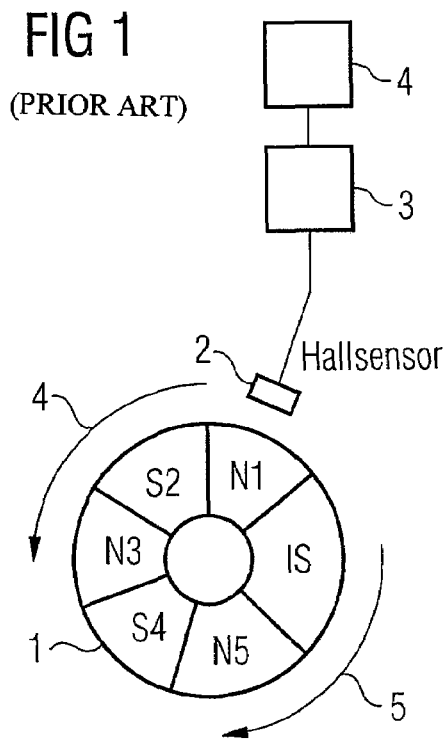
FIG. 1 shows a schematic diagram according to the prior art, wherein an asymmetrical reference pole is configured on the peripheral surface of a drum-shaped magnetic wheel sensor.

FIG. 1 shows a schematic diagram of a magnetic sensor wheel 1 according to the prior art, as generally used for a window lifting or sliding roof drive activated by a separate force in a motor vehicle.

The sensor wheel 1 is attached to the drive shaft of an electric motor (not shown in more detail here). The sensor wheel 1 has an asymmetrical coding (magnetization) and comprises a pole arrangement with five poles N1, S2, N3, N4, N5 and a reference pole IS. The pole width of the poles N1, S2, N3, N4, N5 is smaller than the pole width of the reference pole IS. On the peripheral side of the sensor wheel 1, separated by an air gap, is a stator-resistant magnetic field detector (Hall sensor) 2. The Hall sensor 2 detects the air gap field. A signal device 3 generates an electrical pulse signal from the magnetic field detected by the Hall sensor 2. This electrical pulse signal is fed to an evaluation/control unit 4. The evaluation/control unit 4 has a microcontroller. The microcontroller is controlled by the edges of the pulse signal by means of interrupts. This allows a counter variable (control position) to be determined. The edges can also be used to calculate the speed of rotation (actuator speed). In the event of reversing the edges are evaluated to determine the actual reversal of the direction of rotation.

The pulse diagram in FIG. 2 corresponds to a rotational movement without reversing. During rotation of the sensor wheel 1 in the direction of the arrow 5 in FIG. 1 the rotor speed-dependent pulse diagram shown in FIG. 2 results (hereafter the "high" pulse duration corresponds to a magnetic "SOUTH" and a "low" pulse duration to a magnetic "NORTH"). The curve pattern in FIG. 2 first comprises a series of electrical pulses, which produce the north and south poles N1, S2, N3, S4, N5 past the sensor 2 during a rotation according to arrow 5. According to the equal pole width of these poles the pulse duration of these pulses is of equal length. The subsequent longer pulse duration of the reference pole IS over the course of time is correspondingly larger due to the greater pole width of the reference pole IS.

FIG. 3 shows the instance where the drive reverses. At a point, when the pole N3 is opposite and adjacent to the Hall sensor 2 in the air gap (the reference pole IS of the sensor wheel 1 is diametrically opposite the Hall sensor 2 in this position of the sensor 1), the direction of rotation is reversed by the reversal in the polarity of the armature voltage (new direction of rotation arrow 4). The point of the polarity reversal is shown in FIG. 3 by the line 5. Due to mechanical inertia the actual reversal of the direction of rotation takes place with a time delay in relation to this however, as shown in FIG. 3 by the broken line 6.

The pulse diagram in FIG. 3 is symmetrical about the line 6. This means that, in the event of a reversal of the direction of rotation, when the evaluation/control unit 4 evaluates the pulse edges, it can no longer be determined whether subsequent pulses should be assigned to the continued or reversed direction of rotation. A counter error of plus/minus half a rotation can result, which can impair the effectiveness of the anti-trap protection.

Figure 4:
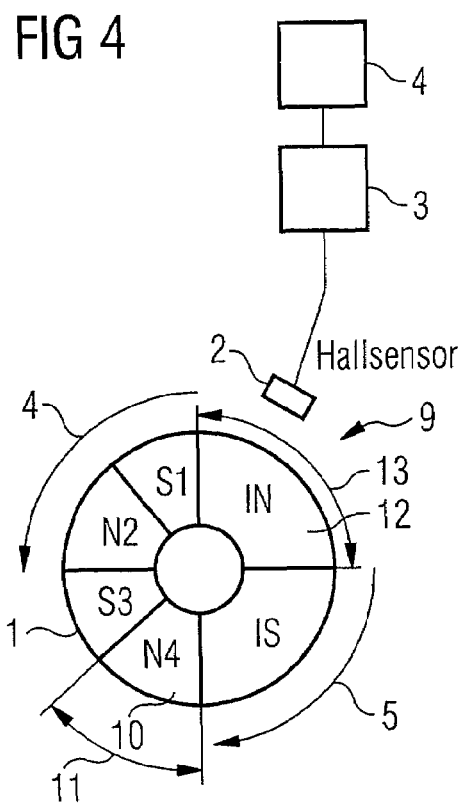
FIG. 4 shows a schematic diagram according to an exemplary embodiment of the invention, wherein an asymmetrical reference pole pair is configured on the peripheral surface of the magnetic sensor wheel.

FIG. 4 shows a schematic diagram of an exemplary embodiment of the invention. The sensor wheel 1 is asymmetrical here too but does not have an index pole with a wider pole width as in FIG. 3, having instead a reference pole pair, comprising the reference north pole IN and the reference south pole IS. The pole width of the poles IN and IS is designed such that it is significantly wider than that of the poles S1, N2, S3, N4 even with manufacturing fluctuations of the magnetic wheel 1.

In the case of a rotation according to the arrow 4 in FIG. 4, the pulse diagram (without reversing) shown in FIG. 5 results. It first comprises pulses of equal length N4, S3, N2, S1, followed by the comparatively longer pulse lengths IN and IS of the reference pole pair IN, IS.

FIG. 6 at the bottom again shows the pattern of the pulses during a reversal of the direction of rotation. As shown clearly in FIG. 6, the pulse diagram no longer has mirror symmetry about the line 8. It is therefore possible for the evaluation/control device 4 to determine by evaluating the edges whether the acquired subsequent edges are to be assigned to the continued direction of rotation or to the reversed direction of rotation. The counter error referred to above can thereby be compensated for.

Figure 7:
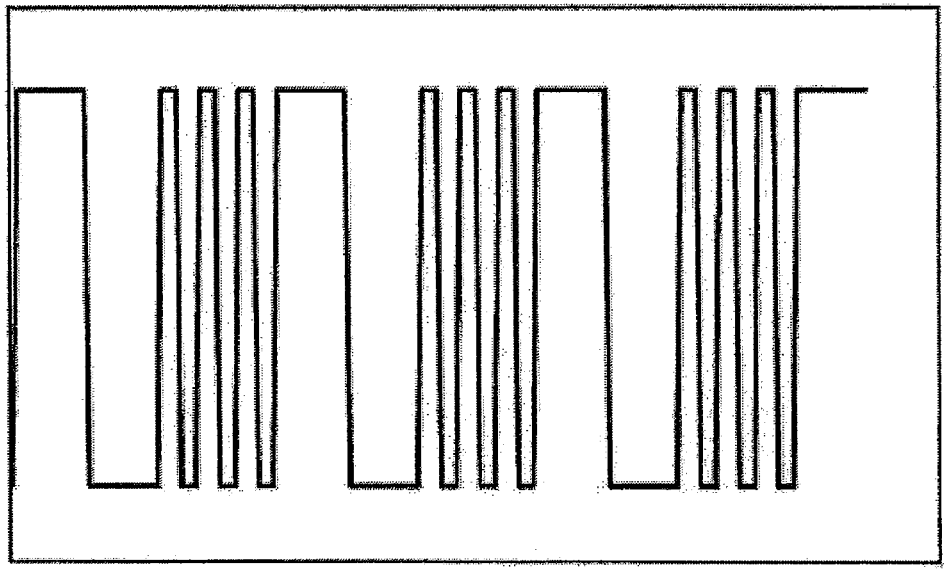
FIG. 7 shows a measured pulse diagram of a window lifting drive with a sensor wheel, whereon an inventive coding structure is configured, during an opening process without movement reversal.
Figure 8:
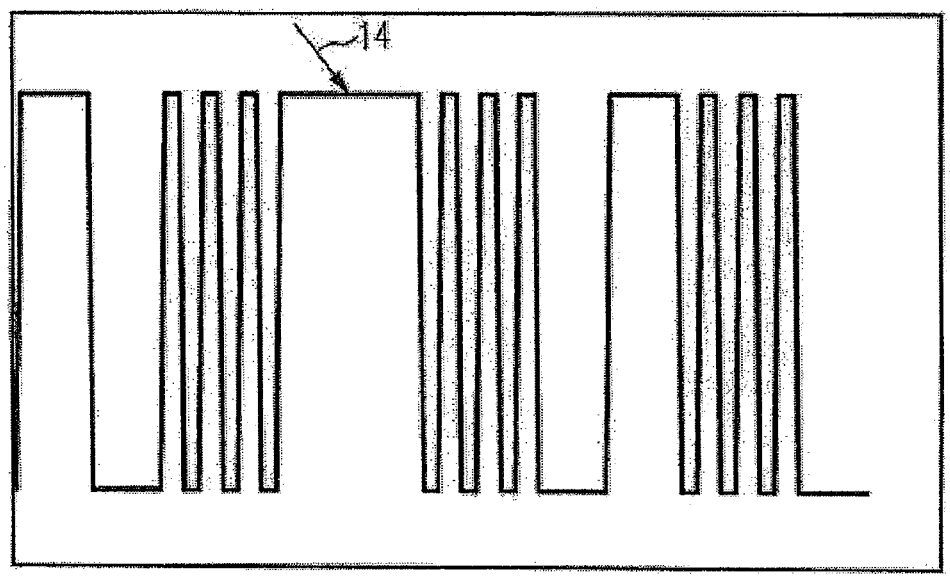
FIG. 8 shows the pulse diagram of FIG. 5 with reversal of the direction of rotation in the region of the magnetic pole pair.
Figure 9:
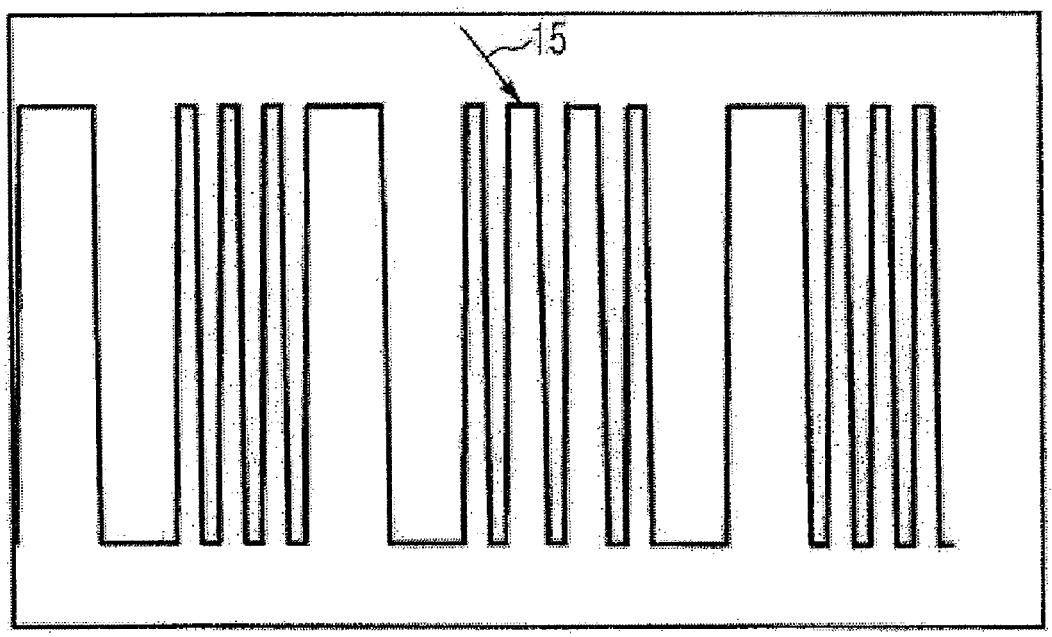
FIG. 9 shows the pulse diagram of FIG. 5 with reversal of the direction of rotation in the region of a magnetic pole.

FIGS. 7, 8 and 9 show measured pulse diagrams of a window lifting drive in a motor vehicle. A magnetic wheel with the inventive coding structure is attached to the motor shaft. The air gap magnetic field is detected by a single Hall sensor. The curve pattern shown is the result of a scan of the Hall sensor signal.

FIG. 8 shows the continuous operation of the drive during an opening process of the window. The coding structure of the sensor is mapped during the course of the pulses: a long "high" signal followed by a "low" signal of equal length (magnetic pole pair) followed by six pulses of comparatively shorter pulse length (magnetic poles), etc.

In contrast FIG. 8 shows a reversal of the direction of rotation. In the pattern it follows the long "high" signal (arrow 14). Reversal of the direction of rotation can be seen clearly from the pattern of pulses, in that the falling edge of long "high" signal after long "low" signal is missing.

The pulse diagram in FIG. 9 shows a reversal of the direction of rotation on a short "high" signal of a magnetic pole (arrow 15). During the reversal itself it is at first not possible for the evaluation/control unit 4 to establish precisely the direction in which the motor position should be counted (the signals have a similar width during the next edges). However with the signal of the magnetic pole pair (reference coding sector pair IN, IS) that now follows, it is clear that the motor is already rotating in the other direction (long "low" signal, followed by a long "high" signal). Identifying the actual direction of rotation allows the counter pulses to be assigned correctly in the evaluation/control device 4. This provides accurate information about the position of the actuator. This improves protection if trapping occurs. As it moves into the closed position, the motor-operated closing element (window or sliding roof) can move fully into position.

| | List of reference characters used |
|---|---|
| 1 | Sensor wheel |
| 2 | Detector, Hall sensor |
| 3 | Signal device |
| 4 | Evaluation/control unit |
| 5 | Switching point of armature voltage of motor (with an incremental sensor system according to the prior art) |
| 6 | Actual reversal of direction of rotation (with an incremental sensor system according to the prior art) |
| 7 | Switching point (with an incremental sensor system according to the invention) |
| 8 | Actual reversal of direction of rotation (with an incremental sensor system according to the invention) |
| 9 | Coding structure |
| 10 | Coding sector |
| 11 | First sector width |
| 12 | Reference coding sector pair |
| 13 | Second sector width |
| 14 | Arrow |
| 15 | Arrow |

What is claimed is:

1. A device for determining the actual reversal of the direction of rotation of a rotational drive continuing to operate after previous switching of the direction of rotation comprising:
   a sensor wheel with a coding structure configured asymmetrically in respect of distribution along the periphery of the sensor wheel;
   a single detector, which generates a rotor speed-dependent pulse signal during rotation of the sensor wheel by scanning the coding structure; and
   an evaluation unit, to which the pulse signal is fed and which determines the actual reversal of the direction of rotation by evaluating the pulse edges, wherein the coding structure is formed by coding sectors each having a first sector width and a reference coding sector pair, each reference coding sector having a second sector width that is significantly different from the first pole width.

2. The device as claimed in claim 1, wherein the sensor wheel is configured as a magnetic wheel and said coding sectors have north and south poles of a first pole width and said reference coding sectors area reference pole pair comprising a north and a south pole each having a second pole width that is significantly different from the first pole width.

3. The device as claimed in claim 2, wherein the second pole width is greater than the first pole width.

4. The device as claimed in claim 2, wherein the pole widths of the poles of the reference pole pair are of equal size.

5. The device as claimed in claim 2, wherein four poles of the first pole width are present and the detector is formed from a single Hall sensor.

6. The device as claimed in claim 1, wherein the evaluation unit contains a microcontroller, to whose interrupt input the pulse signal is fed, every rising and falling pulse edge triggering an interrupt at the microcontroller.

7. The device as claimed in claim 6, wherein during an interrupt a time value generated internally in the microcontroller is stored in a table and pulse signal lengths are determined and stored continuously by differentiation with corresponding time values stored previously in the table.

8. The device as claimed in claim 7, wherein the actual reversal of the direction of rotation is determined based on a change from a monotonous increase to a monotonous decrease in the pulse signal lengths.

9. The device as claimed in claim 7, wherein the table contains pulse signal lengths, which were determined by means of an averaging method during first commissioning.

10. The device as claimed in claim 1, wherein the pulse signal is formed by digital rectangular pulses.

11. The device as claimed in claim 6, wherein a triggered interrupt passes through a control routine present in the microcontroller before a time value is stored.

12. The device as claimed in claim 11, wherein the control routine checks the logical state of the pulse signal before and after the pulse edge.

13. The device as claimed in claim 1, wherein the device is part of a window lifting system or sliding roof drive in a motor vehicle.

14. A method for determining the actual reversal of the direction of rotation of a rotational drive continuing to operate after previous switching of the direction of rotation, comprising:
    providing a sensor wheel with a coding structure configured asymmetrically in respect of distribution along the periphery of the sensor wheel;
    generating a rotor speed-dependent pulse signal during rotation of the sensor wheel by scanning the coding structure; and
    evaluating pulse edges of the pulse signal for determining the actual reversal of the direction of rotation, wherein the coding structure is formed by coding sectors each having a first sector width and a reference coding sector pair, each reference coding sector having a second sector width that is significantly different from the first pole width.

15. The method as claimed in claim 14, comprising the step of feeding the pulse signal to an interrupt input of a microcontroller, wherein every rising and falling pulse edge triggers an interrupt.

16. The method as claimed in claim 15, wherein during an interrupt a time value generated internally in the microcontroller is stored in a table and pulse signal lengths are determined and stored continuously by differentiation with corresponding time values stored previously in the table.

17. The method as claimed in claim 16, wherein the actual reversal of the direction of rotation is determined based on a change from a monotonous increase to a monotonous decrease in the pulse signal lengths.

18. The method as claimed in claim 16, wherein the table contains pulse signal lengths, which were determined by means of an averaging method during first commissioning.

19. The method as claimed in claim 14, wherein the pulse signal is formed by digital rectangular pulses.

20. The method as claimed in claim 15, wherein a triggered interrupt passes through a control routine present in the microcontroller before a time value is stored.

21. The method as claimed in claim 20, wherein the control routine checks the logical state of the pulse signal before and after the pulse edge.

* * * * *